J. ROBETAILLE.
SHOVEL.
APPLICATION FILED MAR. 3, 1915. RENEWED MAY 27, 1918.
1,289,916.
Patented Dec. 31, 1918.
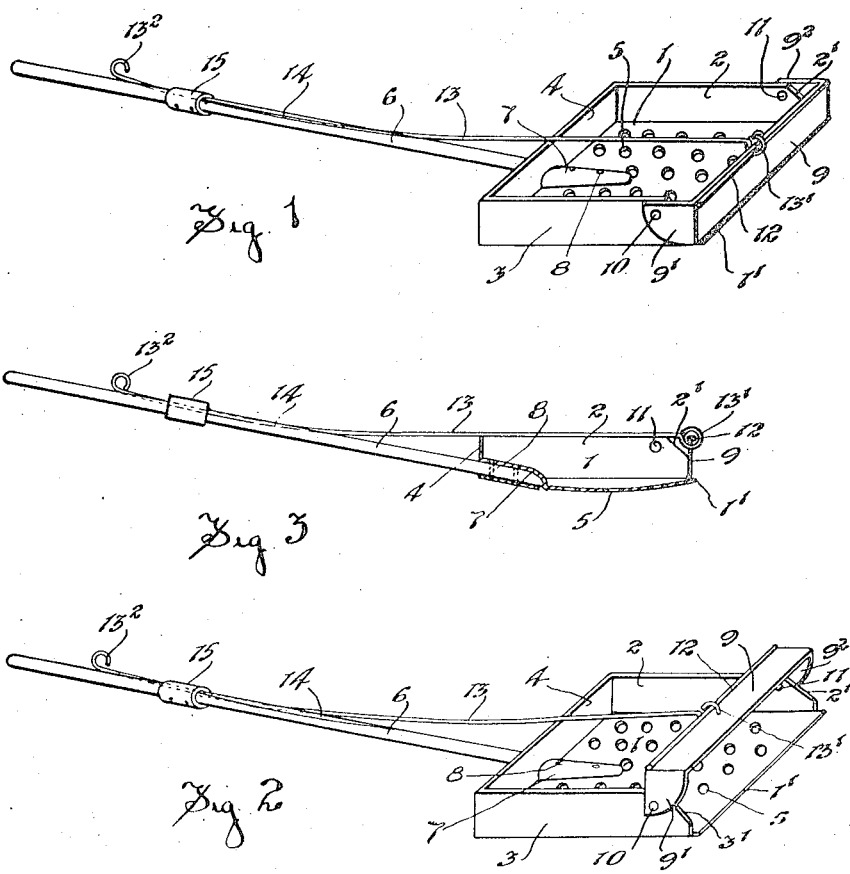
WITNESSES
INVENTOR
By
Attorney.

UNITED STATES PATENT OFFICE.

JOSEPH ROBETAILLE, OF ST. BONIFACE, MANITOBA, CANADA.

SHOVEL.

1,289,916.　　　　　Specification of Letters Patent.　　Patented Dec. 31, 1918.

Application filed March 3, 1915, Serial No. 11,823. Renewed May 27, 1918. Serial No. 236,922.

*To all whom it may concern:*

Be it known that I, JOSEPH ROBETAILLE, of the city of St. Boniface, in the Province of Manitoba, Canada, have invented certain new and useful Improvements in Shovels, of which the following is the specification.

The invention relates to improvements in shovels and the object of the invention is to provide a shovel which can be used for the ordinary purposes of a shovel as well as a shaker for screening material scooped up by it. A further object of the invention is to provide a shovel of the above class which is simple in design, inexpensive to construct and durable when in use.

With the above objects in view the invention consists essentially in a perforated scoop shaped body fitted with a handle, a swinging closure end piece and means for manipulating the end piece to open or closed positions, the parts being arranged and constructed as hereinafter more particularly described and later pointed out in the appended claim.

Figure 1 represents a perspective view of my improved shovel with the swinging end piece closed.

Fig. 2 represents a perspective view of my shovel with the swinging end piece open.

Fig. 3 represents a longitudinal sectional view through the shovel.

In the drawing like characters of reference indicate corresponding parts in each figure.

1 represents a shovel or scoop fitted with the usual upturned and meeting sides and end, 2, 3 and 4 respectively.

The forward upper corners of the sides are cut away as shown at 2' and 3' while the body of the shovel is perforated as shown at 5 and slightly bellied.

6 is a handle secured to the shovel in the ordinary way such as by fitting the inner end thereof within a socket 7 and fastening it in position by rivets 8.

9 is a swinging closure end having the body portion thereof of a length equal to the width of the shovel and of a height equal to the sides thereof.

The end piece has the extremities 9' and 9² thereof turned backwardly at right angles to the body and connected pivotally by means of rivets or such like 10 and 11 to the sides of the shovel. This end piece is reinforced by applying a cross strip 12 to the upper edge thereof and it is designed normally to close the forward end of the shovel, the said end piece having, in the closed position, the lower edge thereof bearing on the forward edge of the shovel body, which it will be noticed projects, as indicated at 1', beyond the sides.

13 is a rod having the forward end thereof formed into an eye 13' which is hooked around the reinforcing cross piece of the swinging end.

The rear end of the rod is formed into a loop 13² so that the rod can be readily manipulated by an attendant grasping the loop.

The body of the handle is fitted with a longitudinally disposed groove 14 which receives a portion of the rod which it will be noticed is slightly bent and the rod is retained within this groove by a sleeve 15 fastened permanently to the handle.

In using the article for shoveling purposes, the adjustable end is swung upwardly, by pulling on the rod, to the position shown in Fig. 2 of the drawing. The material to be shoveled is then free to enter the shovel in the usual way through the open end. If it is desired to shake or screen the material placed in the shovel, the adjustable end is thrown down by pushing the rod forwardly and then the shovel is reciprocated or shaken to allow the finer material to pass through the perforations.

The spring of the rod, in the pulled back position, acts automatically to hold back the swinging end in the set open position.

What I claim as my invention is:—

The combination with a shovel having upturned side walls and back, an open front and a perforated bottom and a swinging closure end piece for the open front of the shovel having the ends thereof pivotally attached to the sides of the shovel and an upwardly inclined extending handle attached to the back of the shovel and provided with a longitudinally disposed groove, of an actuating rod having the forward end thereof extending over the top of the shovel and pivotally attached to the upper edge of the closure piece and the rear end thereof slidably received within the groove in the handle and terminating in a loop and a sleeve permanently mounted on the handle to frictionally engage the rod and retaining the rod within the groove.

Signed at Winnipeg, this 10th day of February 1915.

JOSEPH ROBETAILLE.

In the presence of—
G. S. ROXBURGH,
S. SILVERT.

Copies of this patent may be obtained for five cents each, by addressing the "Commissioner of Patents, Washington, D. C."